MAGNETIC TAPE DUPLICATING DEVICE WITH FLUID PRESSURE APPLIED THROUGH HEAD GAP

Filed June 28, 1967 2 Sheets-Sheet 1

INVENTOR
Racime van den Berg

By V. H. Cleary
ATTORNEY

United States Patent Office 3,472,971

Patented Oct. 14, 1969

3,472,971

MAGNETIC TAPE DUPLICATING DEVICE WITH FLUID PRESSURE APPLIED THROUGH HEAD GAP

Racime J. van den Berg, San Jose, Calif., assignor to International Business Machines Corporation, Armonk, N.Y., a corporation of New York Filed June 28, 1967, Ser. No. 649,680
Int. Cl. G11b *5/00;* B65h *17/32*
U.S. Cl. 179—100.2 2 Claims

ABSTRACT OF THE DISCLOSURE

A magnetic transfer system that transfers a magnetic image from a high coercivity master to a lower coercivity slave tape by passing them through a changing magnetic transfer field with the tapes having a pressure contact therebetween while travelling through the field. The pressure is provided by a fixed and movable head that expels air toward the two tapes. The transfer magnet is in the fixed head and the air is expelled through the magnetic air gap as well as through holes on either side of the magnetic air gap. A pneumatic cylinder is employed to latch the movable head into position to provide the necessary pressure for effecting magnetic transfer while the slave and the master pass through the magnetic field.

BACKGROUND OF THE INVENTION

Field of the invention

Magnetic recording by magnetic transfer from a master tape to a slave tape.

DESCRIPTION OF THE PRIOR ART

In conventional magnetic transfer, it is necessary to provide pressure between the master and the slave while the master and slave tapes are passing through the magnetic transfer field. Normally, this is done by pressure rollers or pressure pads forcing the tapes against the magnetic head. This results in more friction against the head than the roller so that a relatively large amount of slippage occurs between the tapes resulting in inferior reproduction. This is due to tracking errors (particularly in the reproduction of angular video tracks) as well as tape erasing. Further, this friction requires a relatively high power tape drive.

SUMMARY OF THE INVENTION

It is therefore an object of the invention to provide a new and improved magnetic transfer method and apparatus.

A further object of the invention is the provision of new and improved magnetic transfer method and apparatus that effects magnetic transfer of a magnetic image from a master to a slave tape with a high degree of accuracy.

A still further object of the invention is to provide a new and improved magnetic transfer method and apparatus which requires a minimum of power to drive and has a minimum of tape tension when magnetically transferring a signal from a master tape to a slave tape.

The above objects of the present invention are accomplished by a magnetic transfer method and device which has an excitation means for producing a magnetic transfer field. A master and slave tape are passed through this field and while passing through this field, air pressure is applied on one side to the master tape and on the other side to the slave tape in order to provide the required pressure between the tapes to thereby effect magnetic transfer.

DESCRIPTION OF THE PREFERRED EMBODIMENT

General description

Figure 1:
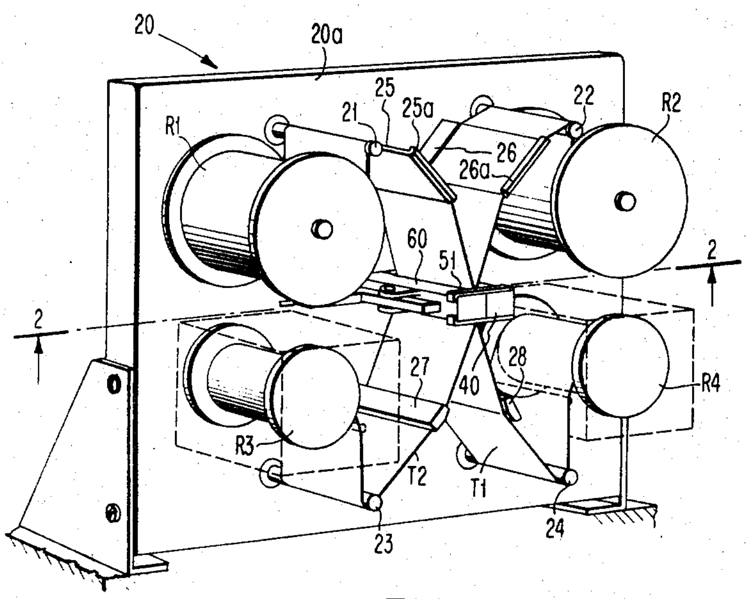
FIG. 1 illustrates an isometric view of the magnetic transfer device embodying the invention.

The embodiment of the invention illustrated in the drawings comprises a support means 20 having taped guiding means secured thereto. Mounted on the support means 20 are take-up reels R1 and R2 and supply reels R3 and R4. R4 holds a high coercivity master tape T1 containing a desired signal such as a video or audio signal to be transferred to a lower coercivity slave tape T2 on reel R3. The master tape T1 and the slave tape T2 are threaded between guides on support 20 and through a slot formed by two pressure heads 40 and 60 and are then attached by some suitable means to take-up reels R1 and R2, respectively. The fixed pressure head 40 contains a magnetic means which produces a varying magnetic field to transfer the signal from the master tape T1 to the slave tape T2. The pressure head 60 has limited movement after release from a lock means 30 so as to aid in threading the tape through or between the heads 40 and 60. The movable head 60 does not contain means for producing a magnetic field, but does contain an air pressure source.

The air pressure in the head 40 is expelled through the magnetic air gap formed by the magnet for producing the bias field. Additional pressure is applied through several other rows of apertures parallel to the magnetic air gap in the head 40. The movable head 60 has pressure sources which are aligned with the pressure sources of the fixed heads 40. An air pressure source 80 is employed to provide the required pressure between or for the pressure heads 40 and 60. Thus, by utilizing the the air pressure instead of mechanical pressures such as rollers or pads, it has been discovered that far less slippage occurs between the tapes and less power from motors M1 and M2 is required to drive the tape through the excitation field. In addition, it has been discovered that by utilizing these air pressure heads a uniform pressure is applied to the tapes to provide an even or more uniform magnetic transfer from the master T1 to the slave T2.

DETAILED DESCRIPTION

Figure 2:
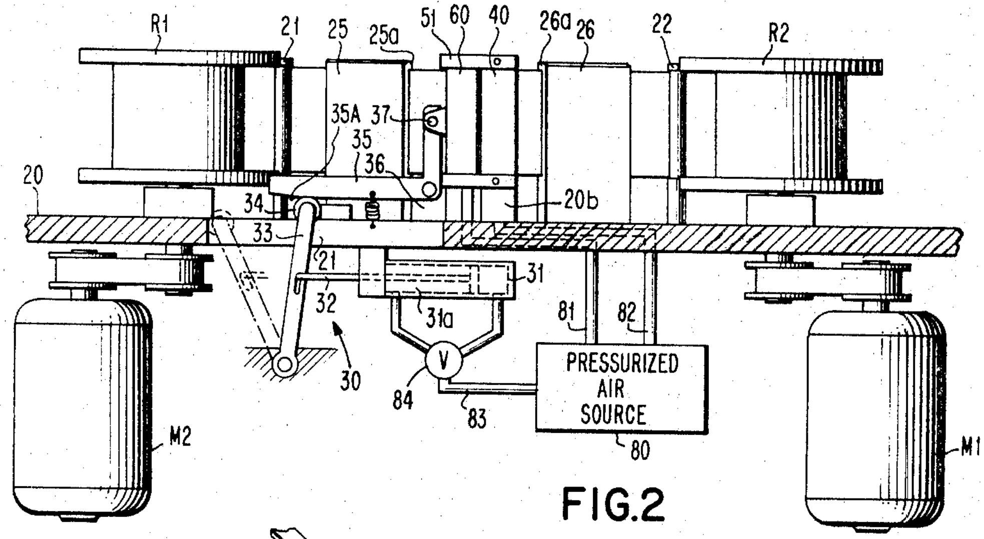
FIG. 2 is a cross-section view taken along lines 2—2 of FIG. 1.

The support structure 20 includes a supporting plate 20*a* with rollers 21, 22, 23 and 24 mounted as shown in FIG. 1. These rollers are rotatably mounted on plate 20*a*. In addition to these rollers for guiding the tape, there are two guide plates 25 and 26 (with slightly convex upper surfaces) having at one end tape guiding flanges 25*a* and 26*a* extending upwardly therefrom as shown in FIG. 1. At the other side of the pressure heads 40 and 60, are additional guide plates 27 and 28 which are positioned equidistant from reels R3 and R4. Likewise, roller 24 is positioned the same distance from the center of reel R3 as roller 24 is from reel R4. Also, the roller 21 and plate 25 are positioned the same distance from roller 21 as roller 22 and plate 26 are from reel R2. The reels R3 and R4 could be employed in a cartridge as shown in dotted lines in FIG. 1. A torque motor M1 is provided to provide a drive for the reel R1 as shown in FIG. 2. Likewise, a torque motor M2 is employed to drive reel R2 as shown in FIG. 2. Suitable means are provided such as an opposing torque motor on supply reels R3 and R4 to maintain tape tension while the tape is driven onto reels R1 and R2.

Figure 8:
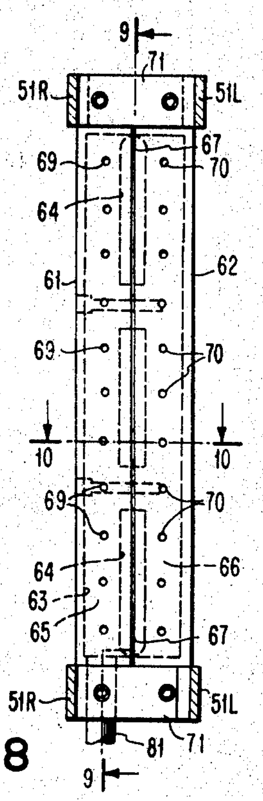
FIG. 8 is an elevation view of the movable air pressure head shown in FIGS. 1 and 2.
Figure 9:
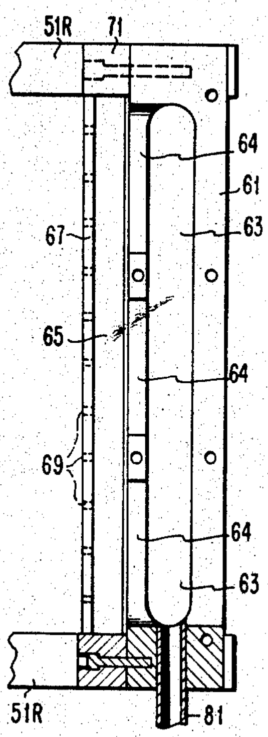
FIG. 9 is a cross-section view taken along lines 9—9 in FIG. 8.
Figure 10:
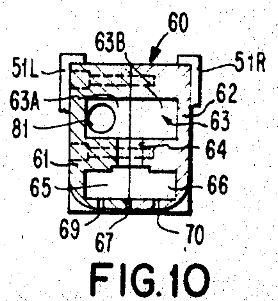
FIG. 10 is a cross-section view taken along lines 10—10 of FIG. 8.

The movable head 60 is shown in FIGS. 8, 9 and 10. This pressure head 60 comprises two complementary type elements 61 and 62 that form a unitary assembly. It will be understood that this asesmbly could be made of more or less than two parts and the two complementary parts are shown only by way of illustration on how to form the air chambers desired.

The two parts 61 and 62 are placed together by screws (not numbered) or some suitable means. Two equally sized recesses 63A in unit 61 and 63B in unit 62 form a large chamber 63 shown in FIGS. 9 and 10. This is a rectangularly shaped chamber. Longitudinally disposed slots 64 are formed by elements 61 and 62. Recess 65 in unit 61 and recess 66 in unit 62 provide another air chamber which overlays air chamber 63. The slots 64 communicate between the pressure chamber 63 and the pressure chamber formed by recesses 65 and 66. As shown in FIG. 9, these two large air pressure chambers are substantially the same size. The pressure head 60 has, as shown in FIG. 10, a lower surface which is curved. On this surface, there is formed on the center thereof as is shown in FIGS. 8, 9 and 10, a longitudinal slot 67. Slot 67 provides an outlet for the air pressure in the chamber formed by recesses 65 and 66. This chamber is sealed at either end by end blocks 71. Also communicating with this air chamber to the exterior are one side of slot 67, a row of a plurality of holes 69 as shown in FIG. 8 and equally spaced from slot 67 another row of holes 70 shown in FIGS. 8 and 10.

A source of pressurized air or an air compressor 80 has outlets 81 and 82. Tubular outlet 81 is connected to the chamber 63. Thus, when pressurized air is developed through the tube 81, it is communicated to chamber 63, then passes through slots 64, into the chamber formed by recesses 65 ano 66 and thence through the slot 67, the row of holes 69 and the row of holes 70.

The curved side shown in the lower side of the pressurized head 60 has at either end, end blocks 71 which seal off the ends of the chamber formed by recesses 65 and 66 and also acts to space the slot 67 and holes 69 and 70 from head 40.

Figure 7:
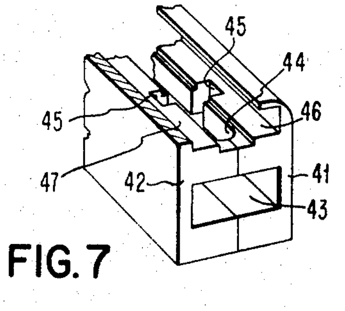
FIG. 7 is an isometric view partially in cross section of the fixed air pressure head shown in FIGS. 1 and 2.
Figure 3:
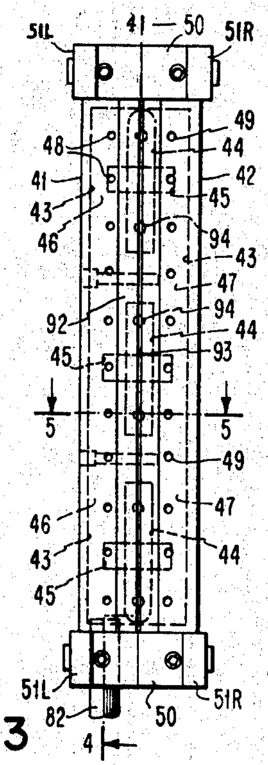
FIG. 3 is an elevation view of the fixed air pressure head shown in FIGS. 1 and 2.
Figure 4:
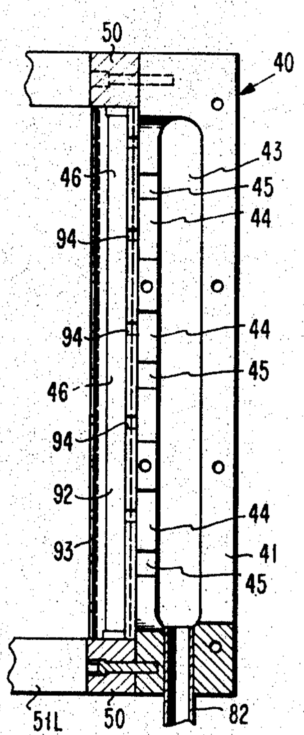
FIG. 4 is a cross-section view taken along lines 4—4 of FIG. 1.
Figure 5:
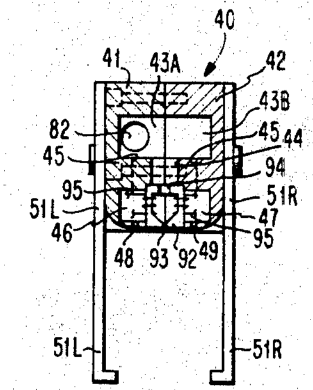
FIG. 5 is a cross-section view taken along lines 5—5 of FIG. 3.
Figure 6:
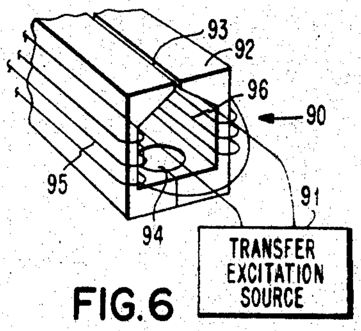
FIG. 6 is an isometric view of the magnetic transfer head illustrated in FIGS. 3, 4 and 5.

The fixed air pressure head 40 is fixed to a spacing mounting block 20*b* which is mounted on panel 20*a*. The construction of this pressure head is somewhat similar to the construction of the movable pressure head 60 and is illustrated in FIGS. 3, 4, 5, 6 and 7. The pressure head 40 comprises two similarly shaped members 41 and 42 which are secured together in side-by-side relationship by screws or other suitable means. Recess 43A in member 41 and recess 43B in member 42 provide an air pressure chamber 43 which is rectangularly shaped (same as chamber 63). At one side of the air pressure chamber 43 is a plurality (three are shown) of longitudinally disposed slots 44 as shown in FIGS. 3, 4, 5, 6 and 7. Transverse to each of these slots 44 communicating with the chamber 43 are slots 45 as shown in FIGS. 4 and 7. As shown in FIG. 7 at the upper side of these slots, there is a recess 44*a* shown in FIGS. 5 and 7. Mounted in this recess 44*a* to produce a magnetic air gap, is a transfer magnet 92 having an air gap 93. This magnet forms an air pressure chamber 96 having holes 94 therein, as shown in FIGS. 4 and 6 together with two end blocks 50 that form an air seal for the ends of chamber 96.

The magnet 92 has windings 95 wound about either pole thereof as shown in FIG. 6. The magnet is positioned as shown in FIGS. 4 and 5 in the rectangular decess 44*a*, and the holes 94 communicate through slots 44 and into the air pressure chamber 43.

Recesses 46 in member 41 and recess 47 in member 42 extend longintudinally of the magnet 92 and have a rectangular cross-section having a length approximately the same length as the air chamber 96 formed by magnet 92. The air chamber 96 and the air chambers 46 and 47 are made airtight at either end by end blocks 50 and 51 with magnet 92 forming one side of each chamber (46 and 47).

The air chamber 46 receives air from air pressure chamber 43 by way of the slots 45 as does the air chamber 47. It will be understood that the width of these slots and their effect on the pressure in this chamber can be selectively determined. The two rows of relatively small holes 48 and 49 as shown in FIGS. 3 and 5 provide air pressure from chambers 46 and 47, respectively, to the exterior and thence to the master and slave tape. Likewise, the air from chamber 96 is expelled through air gap groove 93 to provide pressure to the master and slave tape for magnetic transfer action. The rows of holes 48 and 49 are equally spaced from air gap 93.

Figure 11:
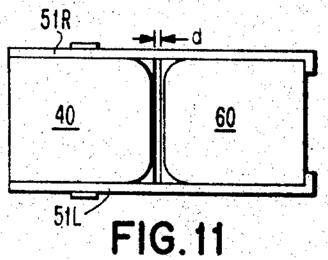
FIG. 11 is an elevation view of the two pressure heads showing the limit or stop for the movable head shown in FIGS. 1 and 2.

Mounted on either end of the stationary pressure head 40 is a pair of L-shaped stop members shown in FIGS. 3, 4, 5, 10 and 11. These stop members are numbered 51L and 51R with a pair at either end. As shown in FIG. 11, the purpose of these stop members is to provide an alignment means for movable head 60 and to limit its backward movement to a distance *d* so as to provide proper alignment despite movement of the movable head 60. Also, they insure proper tape tracking in fast rewind motion.

The magnetic transfer field means 90 includes a transfer excitation source 91 which provides an alternating current (of about 100 kc.). A source and head could be used such as illustrated in U.S. application Ser. No. 606,173, filed Dec. 30, 1966, entitled "Magnetic Duplicating Apparatus" in the name of Elbert T. Hatley. Here, however, for purposes of an example, the excitation source 91 is an alternating current source which is connected through the windings 95 to provide the required alternating or varying magnetic transfer field by way of the air gap 93.

The pressurized air source or air compressor 80 provides compressed air through a tubular member 82 into the air pressure chamber 43. The pressurized air then flows through longitudinally disposed slots 44, apertures 94 to chamber 96 in the magnet 92 and thence through the magnetic air gap 93, the point at which the magnetic transfer field is developed. In addition, the air pressure provided in the chamber 43 is applied through slots 45 into chambers 46 and 47 and thence the rows of apertures 48 and 49, respectively, as shown in FIGS. 3 and 5. Thus, a relatively high pressure is provided at the very point where the magnetic transfer field is developed. In addition, adjacent to this magnetic field, the two rows of apertures 48 and 49 also provide the required pressure between the master and slave tape.

As shown in FIGS. 1 and 2, an L-shaped member 35 is pivotally connected at one end 37 to the movable pressure head 60. Member 35 is pivotally mounted on a block 36 which is fixed to plate 20*a*. A spring 21*a* is connected to plate 20*a* and member 35 so as to tend to rotate member 35 counterclockwise (as shown in FIG. 2) through slot 21. This counterclockwise movement of the arm 35 acts to move the movable head assembly 60 backwardly against the pairs of stops 51L and 51*r*. A pneumatic actuating mechanism 30 is employed. The air pressure source 80 has a conduit 83 connected to a two-way solenoid valve 84 which connects conduit 83 to either side of the piston of cylinder 31. Energizing solenoid valve 84 feeds air to conduit 31A and causes the piston 31E, arm 32, 33 and roller 34 to move to the right. This results in locking the movable head 60 against the fixed head 40. It will be noted that end blocks 71 and 50 are spaced outwardly so as to provide a clearance or a slot in the closed position through which the master and slave tape can be threaded and the recording can be transferred. Viewing FIG. 2, if the solenoid valve 84 is de-energized, the air pressure is provided to the conduit 31*b*, the piston 31E moves to the left with piston arm 32 moving an arm 33 to the left so that a roller 34 and arm 33 are moved to the left on slanted surface 35*a* on L-arm 35. In so doing, spring 21*a* rotates L-arm 35 counterclockwise until head 60 hits stops 51L and 51R. The arm 33 extends through slot 21 of the base 20*a*. In this position, the movable head 60 and head 40 provide a relatively large slot for threading the master and slave tape.

OPERATION OF THE INVENTION

With the head 60 in the retracted position, the master tape T1 from supply reel R4 is as shown in FIG. 1, threaded below the roller 24 inwardly of guide 28 and through and past the slot formed by heads 60 and 40. It is then fed beyond and above the guide member 26 with the tape abutting the guide flange 26A. It is then fed over roller 22 and downwardly onto the take-up reel R2. Tape T1 is then secured to reel R2 by some suitable means (not shown).

The slave tape T2 is fed off the supply reel R3 downwardly below roller 23, inwardly of guide 27 and through the slot formed by the heads 40 and 60. It is then fed upwardly above the guide 25 and adjacent to the tape edge guide 25A to provide an edge guide for the tape. It is then fed over roller 21 and downwardly and secured in some appropriate fashion on the take-up reel R1.

During magnetic transfer, the take-up reels R1 and R2 are driven by motors M1 and M2.

After the tape has been threaded in this appropriate fashion, the solenoid valve 84 is energized feeding air through the conduit 31A so as to drive the roller 34 to the right (FIG. 2) on the canted surface 35*a* and thereby move the pressure head 60 toward pressure head 40 so that the end blocks 71 are in contact with end blocks 50. Since the end blocks 71 are spaced outwardly from the ends of apertures 69, 68 and 70 and the end blocks 50 are spaced outwardly from the air gap 93 and the apertures 49 and 50, a spacing is provided so that the master tape T1 and the slave tape T2 will not contact either of the pressure pads 40 or 60 when air pressure is applied.

During magnetic transfer (with reels R1 and R2 being driven), the excitation source 91 provides current to effect the appropriate varying magnetic transfer field by way of the coils 95 wound about the magnet 92. Due to this magnetic field as is well-known in the art, the magnetic image on the master tape T1 is transferred to the slave tape T2 as the tapes are driven past the transfer station defined by the two pressure heads and the air gap 93.

As the tapes are so driven past the transfer station, air pressure is provided through conduit 81 into pressure chamber 63, through slots 64 and thence through the two rows of holes 69 and 70, and the slot 67. This provides a uniform air pressure against slave tape T2 as directly opposite to the magnetic air gap 93 as well as to two rows closely adjacent thereto.

While the pressure is being applied as above through the pressure head 60, air pressure is provided through conduit 82 into chamber 43 through slots 44, holes 94 into the air chamber 96 formed by the magnets 92 and the end blocks 50. Thus, air pressure from the magnetic air gap 93 is applied to the master tape T1 directly opposite to the air pressure provided by the slot 67 to the slave tape T2.

In addition to the pressure provided through the air gap 93, air pressure is provided through conduit 81 to chamber 43, slots 45 and into air chambers 46 and 47. From there, the air pressure is expelled through a row of holes 48 spaced on one side of the air gap 93 and opposite holes 70. In addition, other air pressure is provided to the master tape by way of the row holes 49 opposite holes 69 and spaced the same distance from the air gap 93 as the row of holes 48.

Thus, the air pressure provided by the pressure heads 40 and 60 provide the required transfer pressure between the master tape T1 and the slave tape T2 directly at the point of the transfer station where the transfer magnetic field is developed. It has been found that adequate pressure required for magnetic transfer between the slave and the master tape can be easily achieved. Further due to the equal amount of friction applied to the master and slave tapes, slippage or creep between the tapes is minimized. Further, due to the low friction only relatively small torque motors are required to drive the reels.

It will now be obvious to those skilled in the art many modifications and variations accomplishing any or all of the objects of the invention and realizing many or all of its advantages but which, however, do not essentially depart from the spirit of the invention.

What is claimed is:

1. A magnetic transfer device wherein a magnetic pattern is transferred from a master magnetic medium to a magnetizable copy medium comprising:

excitation means for producing a magnetic transfer field, means placing said master medium in contact with said copy medium within said magnetic transfer field, including:

first pressure means applying fluid pressure to said master and said copy medium on one side thereof within said magnetic field, second pressure means applying fluid pressure to said master and said copy medium on the opposite side thereof within said magnetic field and, said excitation means located within said first pressure means, said excitation means including a magnetic head having an air gap for producing the magnetic transfer field and wherein said first pressure means applies fluid pressure through said air gap.

2. A magnetic transfer device as set forth in claim 1 with said second pressure means movable from a retractable position to a fixed closed position with respect to said first pressure means.

References Cited

UNITED STATES PATENTS

| | | | |
|---|---|---|---|
| 2,747,026 | 5/1956 | Camras | 179—100.2 |
| 2,747,027 | 5/1956 | Camras | 179—100.2 |
| 2,795,651 | 6/1957 | Camras | 179—100.2 |
| 2,905,767 | 9/1959 | Eckert et al. | 179—100.2 |
| 3,161,120 | 12/1964 | Timares et al. | 226—97 |
| 3,310,792 | 3/1967 | Groom et al. | 179—100.2 |
| 3,320,599 | 5/1967 | Bilawala | 179—100.2 |
| 3,324,570 | 6/1967 | Flaith et al. | 226—97 |

FOREIGN PATENTS

| | | |
|---|---|---|
| 1,001,452 | 8/1965 | Great Britain. |

STANLEY M. URYNOWICZ, Jr., Primary Examiner

JEROME P. MULLINS, Assistant Examiner

U.S. Cl. X.R.

226—97